US012627762B2

(12) United States Patent
Balmakhtar et al.

(10) Patent No.: US 12,627,762 B2
(45) Date of Patent: May 12, 2026

(54) METHODS AND SYSTEMS FOR NETWORK SLICE MONITORING AND VERIFICATION

(71) Applicant: T-Mobile Innovations LLC, Overland Park, KS (US)

(72) Inventors: Marouane Balmakhtar, Fairfax, VA (US); Galip Murat Karabulut, Vienna, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 322 days.

(21) Appl. No.: 18/528,439

(22) Filed: Dec. 4, 2023

(65) Prior Publication Data

US 2025/0184432 A1 Jun. 5, 2025

(51) Int. Cl.
*H04M 15/00* (2024.01)
*H04W 24/08* (2009.01)

(52) U.S. Cl.
CPC ....... *H04M 15/8214* (2013.01); *H04M 15/44* (2013.01); *H04W 24/08* (2013.01)

(58) Field of Classification Search
CPC .. H04M 15/44; H04M 15/8214; H04W 24/08
See application file for complete search history.

(56) References Cited

U.S. PATENT DOCUMENTS

| | | | | |
|---|---|---|---|---|
| 10,623,257 B1 * | 4/2020 | Marquardt | .......... | H04L 41/0846 |
| 12,289,656 B2 * | 4/2025 | Chai | .................. | H04L 12/1428 |
| 2024/0224099 A1 * | 7/2024 | Dhamija | ............. | H04L 41/5009 |

* cited by examiner

*Primary Examiner* — Nguyen T Vo

(57) ABSTRACT

A method comprises generating, by a storage application in a data store implemented as an interplanetary file system (IPFS), a slice data structure dedicated for the network slice in response to receiving the parameters from the slice application, in which the slice data structure comprises the parameters of the network slice, monitoring, by the slice application, usage of the one or more NEs in the network slice by the client, storing, by the storage application in the slice data structure, usage data describing the usage of the one or more NEs in the network slice, and updating, by the storage application, the slice data structure to indicate update data describing an update to one or more parameters of the network slice in response to receiving update data from the slice application.

20 Claims, 9 Drawing Sheets

200

225

400

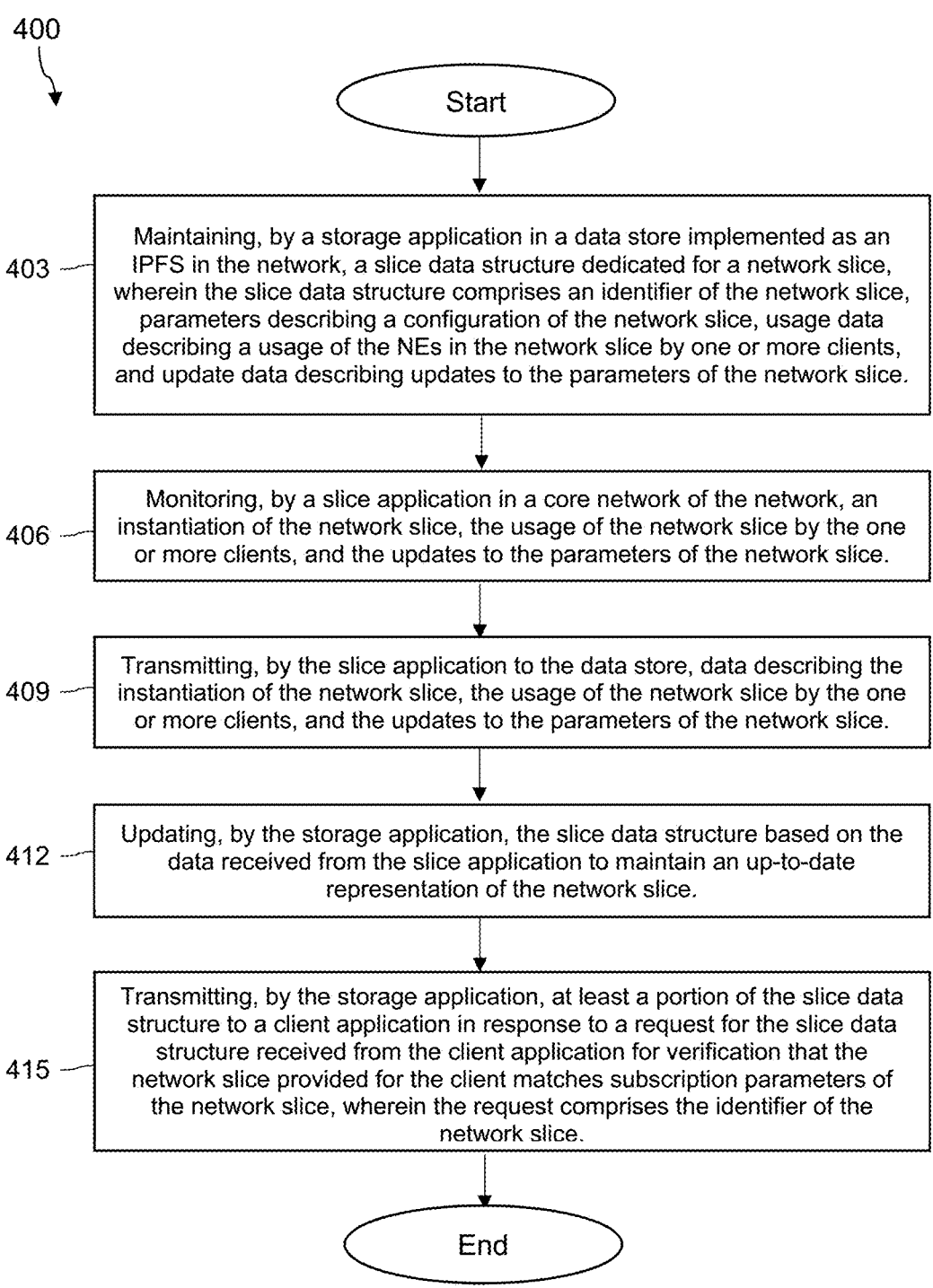

Start

403 — Maintaining, by a storage application in a data store implemented as an IPFS in the network, a slice data structure dedicated for a network slice, wherein the slice data structure comprises an identifier of the network slice, parameters describing a configuration of the network slice, usage data describing a usage of the NEs in the network slice by one or more clients, and update data describing updates to the parameters of the network slice.

406 — Monitoring, by a slice application in a core network of the network, an instantiation of the network slice, the usage of the network slice by the one or more clients, and the updates to the parameters of the network slice.

409 — Transmitting, by the slice application to the data store, data describing the instantiation of the network slice, the usage of the network slice by the one or more clients, and the updates to the parameters of the network slice.

412 — Updating, by the storage application, the slice data structure based on the data received from the slice application to maintain an up-to-date representation of the network slice.

415 — Transmitting, by the storage application, at least a portion of the slice data structure to a client application in response to a request for the slice data structure received from the client application for verification that the network slice provided for the client matches subscription parameters of the network slice, wherein the request comprises the identifier of the network slice.

End

FIG. 4

METHODS AND SYSTEMS FOR NETWORK SLICE MONITORING AND VERIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network slicing overlays multiple virtual networks on top of a shared network, that is, a set of shared network and computing resources. Each network slice corresponds to a particular logical topology, and a separate set of security rules and performance characteristics—within the limits imposed by the underlying physical networks. Different slices can be dedicated to different purposes, such as (1) ensuring a specific application gets priority access to capacity and (2) delivering or isolating traffic for specific users or device classes. Network slicing enables the network operator to maximize the use of network resources and service flexibility. For example, network slicing enables concurrent support for services with vastly different requirements, from a connected vehicle to a voice call, over a common network infrastructure. Functional components and resources may be shared across network slices, but capabilities such as data speed, capacity, connectivity, quality, latency, reliability, and services may be customized in each network slice to conform to a specific service level agreement (SLA).

SUMMARY

In an embodiment, a method for network slice monitoring and verification in a network is disclosed. The method comprises determining, by a slice application in a core network of the network, instantiation of a network slice for a client, in which the network slice comprises one or more network elements (NE) in the network configured to provide a service to the client. The method further comprises generating, by a storage application in a data store implemented as an interplanetary file system (IPFS), a slice data structure dedicated for the network slice in response to receiving the parameters from the slice application, in which the slice data structure comprises the parameters of the network slice. The method further comprises monitoring, by the slice application, usage of the one or more NEs in the network slice by the client, storing, by the storage application in the slice data structure, usage data describing the usage of the one or more NEs in the network slice, wherein the usage data indicates an amount of data or resources consumed in the network slice by the client, and updating, by the storage application, the slice data structure to indicate update data describing an update to one or more parameters of the network slice in response to receiving update data from the slice application.

In another embodiment, a method for network slice monitoring and verification in a network. The method comprises maintaining, by a storage application in a data store implemented as an interplanetary file system (IPFS) in the network, a slice data structure dedicated for a network slice, in which the slice data structure comprises an identifier of the network slice, parameters describing a configuration of the network slice, usage data describing a usage of one or more network elements (NEs) in the network slice by one or more clients, and update data describing updates to the parameters of the network slice. The method further comprises monitoring, by a slice application in a core network of the network, an instantiation of the network slice, the usage of the network slice by the one or more clients, and the updates to the parameters of the network slice, transmitting, by the slice application to the data store, data describing the instantiation of the network slice, the usage of the network slice by the one or more clients, and the updates to the parameters of the network slice, and updating, by the storage application, the slice data structure based on the data received from the slice application to maintain an up-to-date representation of the network slice. The method further comprises transmitting, by the storage application, at least a portion of the slice data structure to a client application in response to a request for the slice data structure received from the client application for verification that the network slice provided for the client matches subscription parameters of the network slice, in which the request comprises the identifier of the network slice. The client application autonomously verifies the subscription parameters of the network slice using the portion of the slice data structure.

In yet another embodiment, a system is disclosed. The system comprises at least one processor, at least one data store implemented as an interplanetary file system (IPFS), a storage application, and a slice application. The storage application is in the at least one data store, which when executed by the at least one processor, causes the at least one processor to be configured to maintain a slice data structure dedicated for a network slice, wherein the slice data structure comprises an identifier of the network slice, parameters describing a configuration of the network slice, usage data describing a usage of the network slice by a client, and updates to the parameters of the network slice. The slice application is stored in the at least one non-transitory memory, which when executed by the at least one processor, causes the at least one processor to be configured to monitor an instantiation of the network slice, the usage of the network slice by the client, and the updates to the parameters of the network slice, and transmit, to the at least one data store, data describing the instantiation of the network slice, the usage of the network slice by the client, and the updates to the configuration of the network slice. The storage application is further configured to update the slice data structure based on the data received from the slice application to maintain an up-to-date reflection of the network slice, and transmit at least a portion of the slice data structure to a billing system application in response to a request for the slice data structure received from the billing system application to generate an invoice for the client, and wherein the request comprises the identifier of the network slice.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flowchart of a second method of network slice monitoring and verification according to an embodiment of the disclosure.

DETAILED DESCRIPTION

Figure 1:
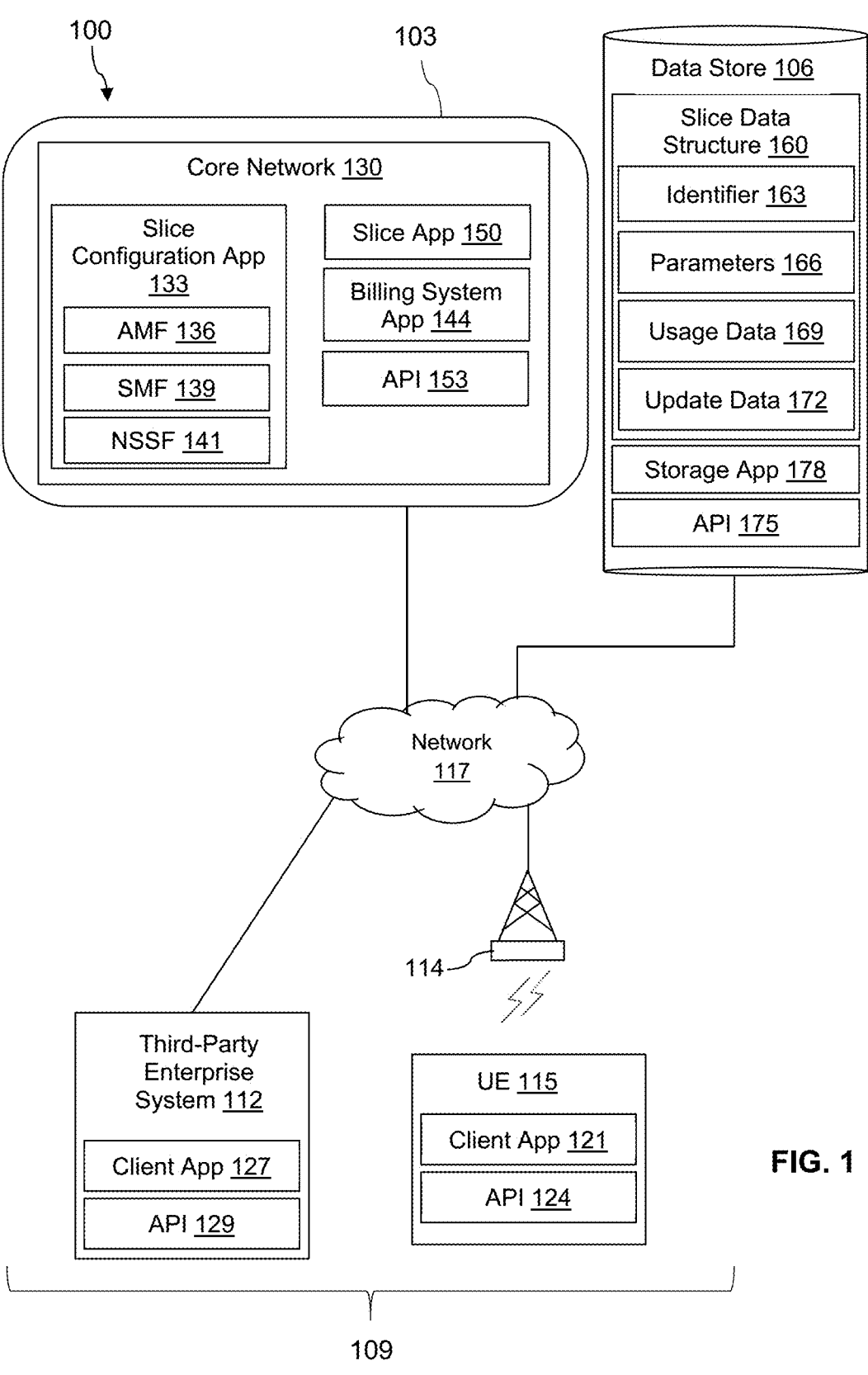
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, network slicing is a configuration that allows multiple networks or sub-networks to be created on top of a common physical infrastructure. Each network slice or portion of the network can be allocated based on the specific needs of a client (e.g., subscriber). To this end, a network slice may include one or more physical or virtual network elements (NEs) in an underlying network. The NEs included in a network slice may include, for example, one or more routers, gateways, switches, virtual network functions (VNFs), virtual machines (VMs), virtual private networks (VPNs), or any other physical or logical component implemented in the underlying network. The NEs in the network slice may be used to provide one or more services to a client based on subscription parameters (e.g., parameters by which to configure the network slice). For example, the subscription parameters may specify a subscribed-for quality of service (QOS) expected by the client. In an embodiment, the NEs may be elements within a core network infrastructure that may be configured and organized to deliver specific services to clients through the instantiation of network slices. An NE may encompass various entities that play a role in the provision of services within a network. For example, an NE may include network functions, or any other entity that is involved in data transmission, processing, or control functions within the network.

In a telecommunications carrier network environment, the network may include a carrier network, which may include a radio access network (RAN) and a core network owned and operated by a telecommunications carrier company. The RAN may include the radio elements of the carrier network, and the core network may include the elements that manage subscriber information, call setup and routing, related system supporting, network slice selection/implementation functions, among other functions. To this end, network slicing may be implemented for different clients across the entire carrier network, including certain elements of the core network. For example, a network slice for a third-party enterprise system may include a dedicated authentication, authorization, and accounting (AAA) component, which may be part of the core network, instead of part of the third-party enterprise system.

Network slicing may also support multiple different access paths (e.g., a wired connection via a N3IWF and a wireless connection via 3GPP access). Regardless of the type of access path, the core network may have a network slice configuration application, which may be used to instantiate network slices for a client and forward client traffic within the network slice. A client may be, for example, a user equipment (UE) of a customer, a third-party enterprise system (which may also be a customer or may be a vendor), or any other device or system which may subscribe to the one or more network slices in the network.

In addition, the configuration of the network slices may need to be adjusted over time for various reasons. For example, a client may change the subscription parameters in a subscription plan, which may result in the need to change the parameters of a network slice created for that client (and/or other clients with similar subscription parameters). Alternatively, network slices may need to be scaled up or scaled down based on, for example, additional usage of the network slice or additional clients attached to the network slice. The scaling up or down of the network slice may in return change the parameters of the network slice. The changes to the configurations of a network slice may be initiated automatically by the network slice configuration application in the core network, and may happen periodically in the background.

Therefore, network slicing, particularly in the telecommunications environment, is a powerful tool to carve out cellular and wired connection attributes to create unique, logical, virtualized networks over a multi-domain infrastructure. However, network slicing should be scalable to thousands of businesses, and thus the provisioning and management of network slices may desirably be an automated and orchestrated process. However, in some cases, network slicing is not scalable, and network slice provisioning and management is not automated. Moreover, details regarding the provisioned network slices may not always be maintained by the network in a centralized up-to-date manner, much less in a secure manner, which may be accessible to clients using the network slice. This may lead to technical problems in the network, such as mismatches between subscription parameters and the actual parameters of the network slice, inconsistencies in the network slice that may lead to network slice outages if handled improperly, inefficiencies in the provisioning of updates to the NEs in a network slice, etc.

The present disclosure addresses the foregoing technical problems by providing a technical solution in the technical field of network slice management. In particular, systems and methods of network slice monitoring and verification are disclosed herein, in which data describing parameters of the network slice, usage of the network slice, and events occurring at the network slice, are all maintained in a secure slice data structure. The slice data structure may be stored in a data store implemented as a decentralized file system. For example, the data store may be implemented as an interplanetary file system (IPFS). IPFS may be a distributed file storage protocol that allows computer systems all over the world to store and serve files as part of a large-scale peer-to-peer network. The slice data structure may be implemented as any type of secure data structure (e.g., container, blockchain, array, list, stack, queue, etc.). In some embodiments, the slice data structure may be immutable once data has been added to the slice data structure. That is, data may be added to the slice data structure, but data already stored to the slice data structure may not be readily modified after the fact. In this way, the slice data structure maintains an accurate reflection of not just the current network slice, but also maintains a history of the network slice.

To this end, the core network may include a slice application, which may be in communication with a network slice configuration application, and thus have visibility into the provisioning, updating, and usage of the network slices in the network. The network slice configuration application may be, for example, a session management function (SMF), an access and mobility management function (AMF), a network slice selection function (NSSF), and/or any other component/function in the core network. The network slice configuration application may be responsible for the instantiation of a network slice based on, for example, a request from a client. The request from the client may be based on a subscription plan guaranteeing a certain application or QoS attribute for the device(s) associated with the client. The instantiation may involve, for example, instructing the NSSF to select or otherwise request creation of a network slice based on subscription parameters in the subscription plan of the client. The network slice configuration application may be responsible for forwarding traffic for the client through the network slice, or providing a particular application or service for the client based on the network slice. The network slice configuration application may also be responsible for updating the network slice based on various different conditions (e.g., updated subscription parameters, more/less clients using the network slice, updated hardware in the network, etc.). In this way, the network slice configuration application performs various tasks related to the network slice.

The slice application may monitor the tasks related to the network slice performed by the network slice configuration application. For example, the slice application may record the instantiation of a network slice by the network slice configuration application, the slice application may record usage of the network slice by monitoring the forwarding of traffic through the network slice for a client or monitoring the provisioning of an application in a network slice for the client. The slice application may also record updates performed on the network slice (e.g., increase bandwidth, decrease latency, tear down, etc.). In this way, the slice application monitors and records all events related to a network slice.

For example, the monitored and recorded data may include parameters of the network slice, events occurring at the network slice, identification of clients using the network slice, identification of the NEs and/or applications associated with providing the network slice, etc. The parameters of the network slice may include QoS attributes associated with providing the network slice (which may have been subscribed-for by the client). For example, the client may have subscribed-for a low latency, high throughput connection through the network, and a network slice having the subscribed-for low latency, high throughput may be provisioned for the client. In this case, the parameters collected by the slice application may indicate values describing the latency and throughput actually implemented along a path of the network slice. The parameters may also include other values identifying or describing the network slice.

The slice application may forward the monitored and recorded data to the data store in the form of messages or application programming interface (API) calls. The storage application at the data store may then create and store the data into the slice data structure. The storage application may add the monitored and recorded data to the slice data structure as, for example, a new entry or a new block, without modifying existing entries or blocks in the slice data structure. The slice application may forward this data to the data store every time an event occurs within the network slice, where the event may be the instantiation of the network slice, usage of the network slice, update of the network slice, tear down of the network slice, etc. The slice application may also temporarily store the data and send the data to the data store intermittently according to a predefined schedule (e.g., every hour, every two hours, twice a day, etc.). When the data store receives the data from the slice application, the storage application may update the slice data structure accordingly.

When the network slice is first being instantiated, the instantiation may be reflected in the data sent by the slice application. In this case, the storage application may first create the slice data structure and generate an identifier of the network slice. The storage application may add the data received from the slice application to the slice data structure, for example, as entries or blocks. The storage application may then generate the identifier for the network slice based on the contents of the slice data structure. For example, the storage application may generate an identifier of the network slice based on a hash function applied to the contents of the slice data structure. The storage application may then add this identifier to the slice data structure. The storage application may also transmit this identifier to the clients that may be authorized to use the network slice. For example, the identifier may be transmitted to the clients in the form of messages or through one or more API calls.

In some cases, clients may use the slice data structure to verify and validate the network slice that has been provisioned for them (e.g., check that the network slice the clients are using indeed comply with the subscribed-for subscription parameters). In an embodiment, the subscription parameters indicating network attributes subscribed for by the client for a network slice may be compared against the parameters stored in the slice data structure, which indicate the actual network attributes implemented at the network slice. This comparison may be used as an immediate verification as to whether the network slice is indeed accurately provisioned on behalf of the client.

As mentioned above, the data store may be implemented using IPFS, such that data in the data store may be queried by other authenticated entities or clients. In the aforementioned case, the clients may query the data store to receive at least a portion of the slice data structure describing the network slice associated with the client. Meanwhile, the clients may maintain the subscription parameters related to that network slice, which may be compared by the clients with the portion of the slice data structure received from the data store. When the data in the slice data structure substantially or completely matches the subscription parameters, the network slice may be considered accurately provisioned in the network for the client. When the data in the slice data structure does not substantially match the subscription parameters, the network slice may not be considered as accurately provisioned in the network for the client, and the situation may be escalated to an operations control center for resolution. In this way, the verification of the network slice provisioning for a client may be performed autonomously by the client, in a relatively low-cost manner in which only the slice data structure may be requested and sent back to the client through the network, with minor computations involved for verification.

In addition, the billing system of the core network may use the slice data structure to accurately invoice the client for use of the network slice. For example, the slice data structure may include usage data indicating the use of the network slice (i.e., an amount of data or resources in the network slice consumed by the client and a duration of consumption of data or resources in the network slice) by a particular client. A billing system application may query the data store for this usage data to retrieve an accurate reflection of the usage of the network slice. The billing system may then develop an accurate invoice accordingly based on the actual usage of the network slice by the client. In this way, the invoicing of the client network slice usage may also be performed in a relatively low-cost manner in which only the usage data in the slice data structure may be requested and sent back to the billing system through the network, with minor computations involved for invoice computation.

In general, the embodiments of network slice monitoring and verification disclosed herein enable the most up-to-date records of the network slice to be maintained at a secure data store in an immutable fashion. By maintaining the most up-to-date records of the network slice, the system may be better suited to detect when possible faults or failures may be occurring within a network slice, when a subscribed for QoS is not properly being implemented at the network slice, or when an application is not properly function in a network slice. By being better suited to detect these network failures and issues, the system itself is more robust in that the network failures and issues may be prevented before a failure or outage occurs. This also generally increases network capacity, which may generally reduce costs at the system and provide a better customer experience.

Turning now to FIG. 1, a network 100 is described. The network 100 comprises a carrier network 103, a data store 106, clients 109, a cell site 114, and a network 117. The example clients 109 shown in FIG. 1 include a third-party enterprise system 112 and a UE 115. The UE 115 may be communicatively coupled to the carrier network 103 and the data store 106 via the cell site 114.

The third-party enterprise system 112 may be a system, including servers with processing, memory, and network resources, owned and operated by a third-party, external to an operator of the carrier network, which may be a telecommunications carrier company. For example, the third-party enterprise system 112 may be owned and operated by a customer enterprise of the telecommunications carrier company or a vendor enterprise providing resources and/or services to the telecommunications carrier company. The third-party enterprise system 112 may include a client application 127, which may be used to enter network slice parameters, updates to network slice parameters, and/or other network slice related data to the core network 130. The client application 127 may be instructions stored in a memory of the third-party enterprise system 112, which when executed by a processor of the third-party enterprise system 112, causes the processor to perform the foregoing functions. The third-party enterprise system 112 may also include one or more APIs 124, which also may be used to send data to and receive data from the carrier network 103.

The UE 115 may be a cell phone, a mobile phone, a smart phone, a personal digital assistant (PDA), an Internet of things (IoT) device, a wearable device, an AR device, a headset device, a laptop computer, a tablet computer, a notebook computer, a medical device, a vehicle computer, etc. The UE 115 may be owned and operated by a customer or subscriber of the carrier network 103. The UE 115 may include a client application 121, which may be used to receive or provide subscription parameters, updates to subscription parameters, and/or other subscription related data to the core network 130. The client application 121 may be instructions stored in a memory of the UE 115, which when executed by a processor of the UE 115, causes the processor to perform the foregoing functions. The UE 115 may also include one or more APIs 124, which also may be used to send the subscription related data to the carrier network 103.

The cell site 114 provides the UE 115 a wireless communication link to the carrier network 103, data store 106, and network 117, each accommodating varying network slicing capacities tailored to different generations of wireless telecommunication protocols, including 5G, long-term evolution (LTE), code division multiple access (CDMA), or global system for mobile communications (GSM). The network 117 may be one or more private networks, one or more public networks, or a combination thereof. While FIG. 1 shows the carrier network 103 and the data store 106 as being separate from the network 117, it should be appreciated that, in some embodiments, at least a portion of the carrier network 103 and the data store 106 may be part of the network 117.

The carrier network 103 may be a network including a radio access network (RAN) and a core network 130. The RAN may include the access network containing the radio elements of a cellular network. The core network 130 may include the elements that manage subscriber information, call setup and routing, related support systems, network slice selection and implementation functions, among other functions. In an embodiment, the core network 130 may be an evolved packet core (EPC) core network. The core network 130 may be configured to implement a 5G, a LTE, a CDMA, or a GSM wireless telecommunication protocol.

The core network 130 may store subscriber data related to one or more end users operating UE 115. The core network 130 may also store customer or vendor data related to one or more third-party enterprise systems 112, which may subscribe to use or be permitted to use the functions in the core network 130 and the radio elements in the RAN. The core network 130 may include the components, functions, and data that may be used to instantiate, monitor, and update network slice instances throughout the network 100 (across the core network 130, the carrier network 103, and/or the network 117).

As shown in FIG. 1, the core network 130 may include one or more slice configuration applications 133. The slice configuration application 133 may refer to one or more of the AMF 136, the SMF 139, the NSSF 141, and/or various combinations thereof. The AMF 136 is a control plane function that handles connection and mobility management tasks. The SMF 139 collects all the information related to packet session management from various other core network 130 components, and controls/orchestrates these network components based on, for example, a request from the AMF 136. For example, the SMF 139 may manage sessions of the UE 115, while the AMF 136 transmits session management messages between the UE 115 and the SMF 139. In some cases, wired and wireless interfaces (e.g., N1 and N3 interfaces) may ultimately meet at the SMF 139, and these interfaces may include traffic and communications related to network slicing and how to set up/forward traffic along an appropriate network slice. Meanwhile, the NSSF 141 may enable the selection of network slice instances that will serve a particular client 109. For example, the NSSF 141 may provide network slice information to the AMF 136 and may be responsible for the management and orchestration of network slices across the network 100. While this disclosure only mentions the AMF 136, SMF 139, and the NSSF 141 as being slice configuration applications 133, it should be appreciated that the core network 130 may include multiple other functions/components that operate together to implement network slicing across the network 100.

While the AMF 136, SMF 139, and the NSSF 141 are shown in FIG. 1 as being included as part of the slice configuration application 133, in some embodiments, the AMF 136, SMF 139, and the NSSF 141 are not part of the slice configuration application 133. Instead, the AMF 136, SMF 139, and the NSSF 141 may be implemented as separate from the slice configuration application 133 and separate from each other. The slice configuration application 133 may be include network functions applicable to a 3GPP network environment, but may also include network functions that are applicable to non-3GPP network environments as well.

The core network 130 may also include a billing system application 144. The billing system application 144 may be responsible for processing the usage and consumption of the carrier network 103, data store 106, and/or network 117 in providing services to the UE 115 or the third-party enterprise system 112 for the purpose of collecting data and invoicing the client 109. For example, the billing system application 144 may receive billing records, determine billing rates, compute the cost of billing records, aggregate records to periodically generate invoices, send invoices to the client 109, and collect payments from the subscriber/customer/vendor.

In some embodiments, the core network 130 may additionally include a slice application 150. The slice application 150 may be in communication with the combination of slice configuration applications 133 to have visibility into the provisioning, updating, and usage of the network slices in the network 100. For example, the slice application 150 may be able to intercept traffic flowing through the different access paths to the SMF 139 (e.g., wired connection via N3IWF and wireless connection via 3GPP access), which may be used to determine network slice instantiation or network slice selection for the traffic. The slice application 150 may monitor network slice selection performed by the NSSF 141 for traffic originating from a particular client 109 or destined for a particular client 109. The slice application 150 may monitor parameters of the network slice itself when traffic is being forwarding through the network slice. For example, the slice application 150 may monitor the QoS attributes of the network slice in which traffic is flowing, in which the QoS attributes may relate to the latency, bandwidth, etc. The slice application 150 may monitor updates to the parameters enforced within the network slice. For example, the slice application 150 may monitor when the QoS attribute for the network slice changes (which may be, for example, when the network slice provides a better latency because more traffic is being forwarded through the network slice). The slice application 150 may monitor when a network slice is being torn down or discarded. The slice application 150 may also monitor when NEs within the network slice are faulty, failing, not functioning properly, etc. The slice application 150 may also monitor when an NE is being added to/removed from/replaced in the network slice. In this way, the slice application 150 may monitor updates to the network slice.

The slice application 150 may also monitor the usage of the network slice, consumption of the data or resources within the network slice, or even the usage of each of the NEs within the network slice. For example, the slice application 150 may monitor when traffic for a particular client 109 is being forwarded along the path of the network slice. As another example, the slice application 150 may monitor when a client 109 is using a particular service (e.g., the AAA function) in the core network 130. Therefore, the slice application 150 may be responsible for monitoring the instantiation, updating, and usage of all of the network slices provisioned in the network 100.

The slice application 150 may also record data regarding each of the aforementioned monitoring tasks. For example, the slice application 150 may record the parameters 166 of the network slice, updates to the parameters 166 of the network slice, identifiers of NEs and/or services associated with providing the network slice, identifiers of new NEs and/or services associated with providing the network slice, identifiers of NEs and/or services removed from the network slice, identifications of clients 109 using the network slice, etc. The slice application 150 may transmit this recorded data to the data store 106, for example, via one or more API 153 calls.

The data store 106 may be a decentralized file system, such as, for example, an interplanetary file system (IPFS). For example, the data store 106 may be located at one or more data centers and implemented as a cloud data storage. The data store 106 may comprise multiple servers and memories, often distributed over multiple locations, with each location being a data center. The data store 106 may store the recorded data received from the slice application 150 in a slice data structure 160, dedicated for a particular network slice. To this end, the data store 106 may store multiple slice data structures 160, each identifying and describing a different network slice provisioned in the network 100. For example, the slice data structure 160 may include an identifier 163 of the network slice, the parameters 166 of the network slice, usage data 169 of the network slice, and update data 172 of the network slice, among other types of data identifying and describing the network slice.

For example, the parameters 166 of the network slice may include the QoS attributes of the network slice, identifiers of the NEs associated with providing the network slice, pointers to the resources associated with providing the network slice, identifiers of clients 109 authorized to use and/or forward traffic through the network slice, etc. The usage data 169 of the network slice may include a history of usage events associated with the network slice, in which each usage event may include consumption data regarding an amount of data or resources consumed by a client and a duration of the consumption. The usage event may also include details related to the client 109 that consumed the resources associated with providing the network slice, a duration of using the network slice, bandwidth used by the network slice, services used by the network slice, etc. To this end, the usage data 169 may include a history of usage events of the network slice. The update data 172 may include data related to any and all updates performed to the network slice (e.g., addition of or deletion of NEs on the network slice, scaling up or down of the network slice, etc.).

The slice application 150 may send the recorded data to the data store 106 via API 153, as mentioned above, and an API 175 at the data store 106 may be used to receive the recorded data. The data store 106 may include a storage application 178, which may be used to process the data received from the slice application 150 and either generate the slice data structure 160 (after instantiation of the network slice) or update the slice data structure 160 (e.g., add parameters 166, usage data 169, update data 172, etc.). The storage application 178 may also be used to generate the identifier 163 based on, for example, the contents of the generated slice data structure 160. For example, the storage application 178 may generate the identifier 163 by performing a hash function on the contents in the slice data structure 160.

The storage application 178 may also send the generated identifier 163 of the network slice down to the clients 109 that may be authorized to use the network slice. For example, the storage application 178 may send the identifier 163 of a network slice to UE 115, in which attributes of the network slice match subscription parameters requested by the subscriber behind the UE 115. Similarly, the storage application 178 may send the identifier 163 of a network slice to the third-party enterprise system 112, in which the network slice includes the particular function requested and possibly subscribed-for by the third-party enterprise system 112.

Figure 2A:
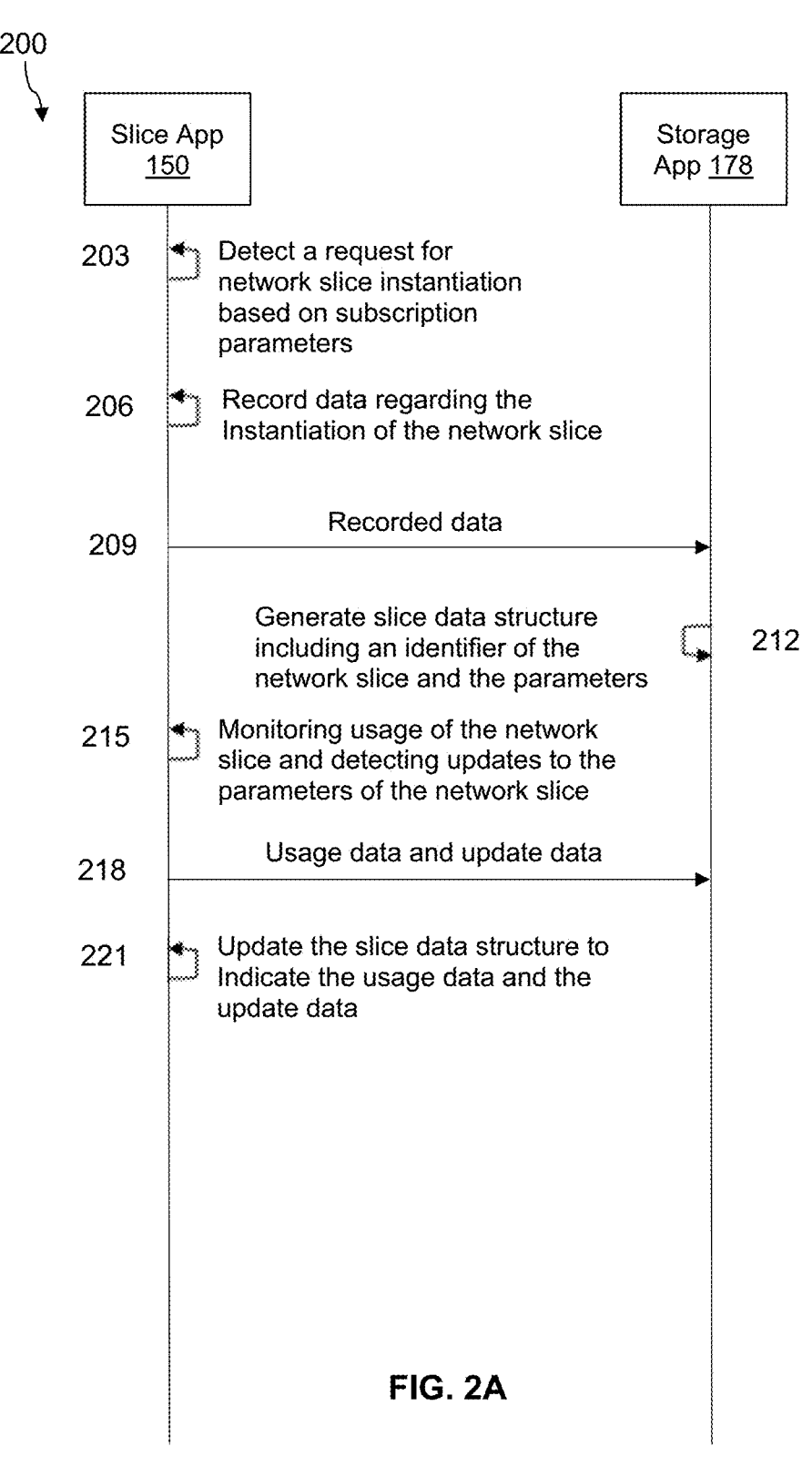
FIGS. 2A-C are message sequence diagrams illustrating methods of network slice monitoring and verification performed between different components of the communication system of FIG. 1 according to various embodiments of the disclosure.
Figure 2B:
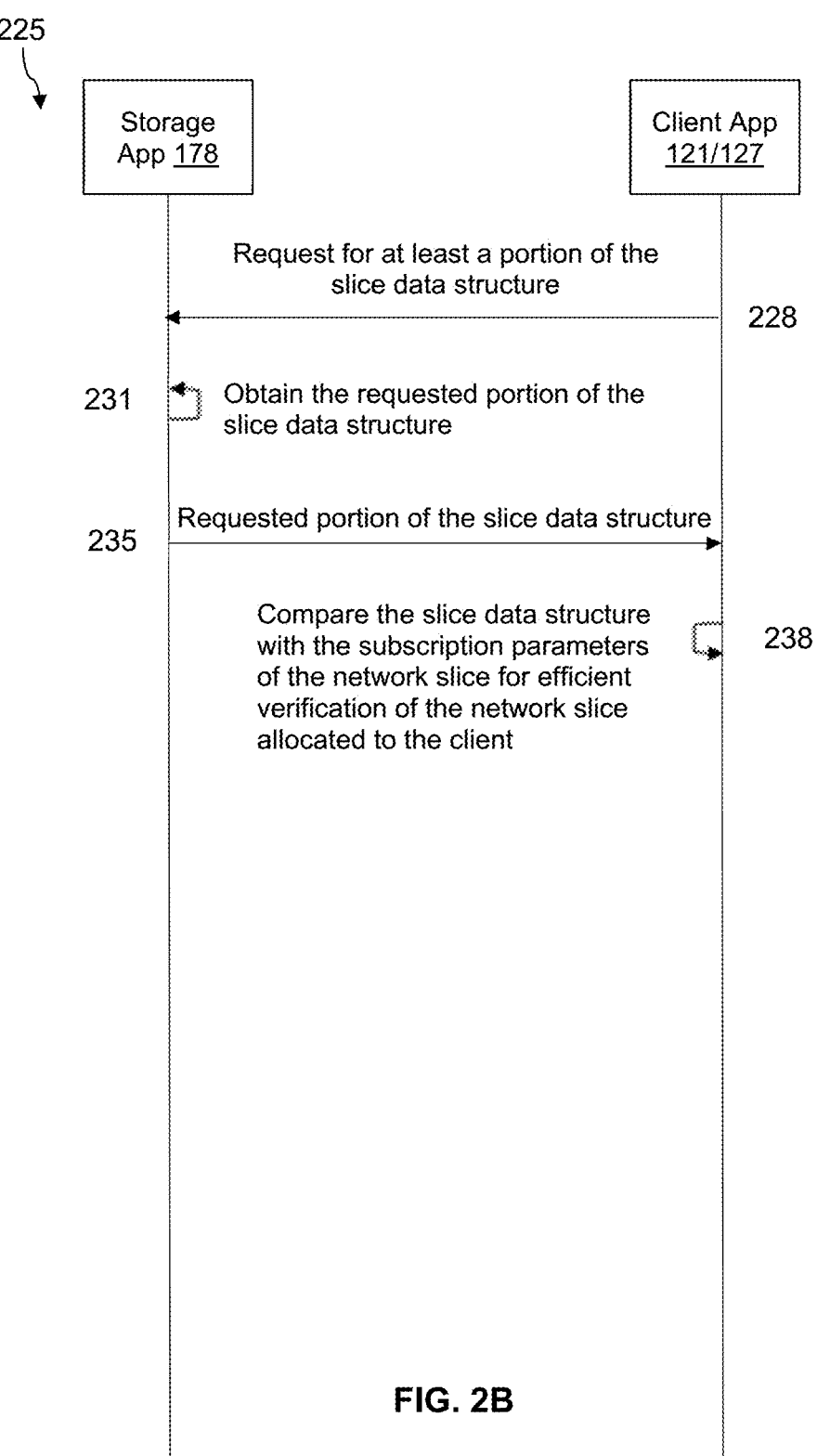
Figure 2C:
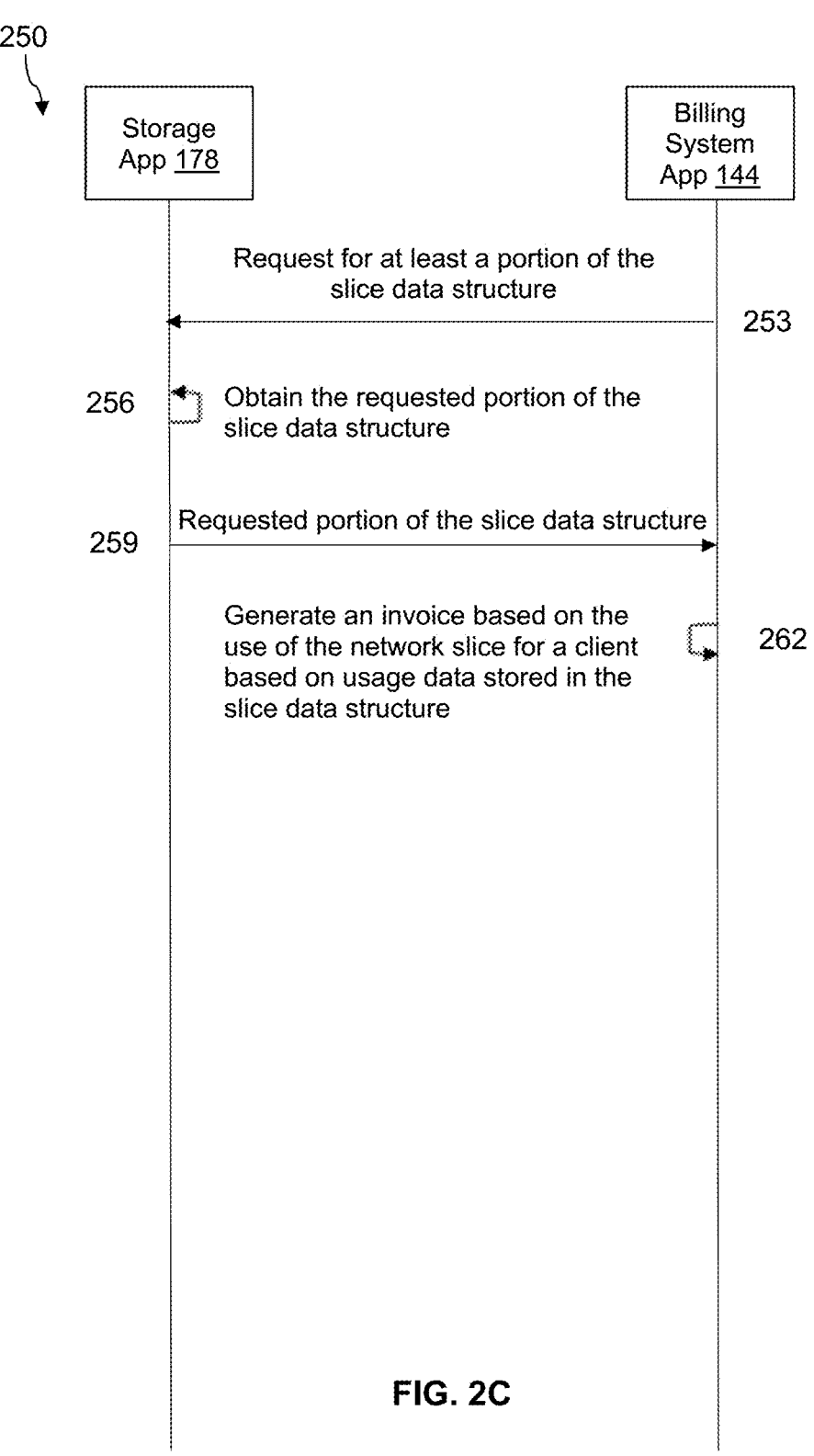

Referring now to FIGS. 2A-C, shown are message sequence diagrams illustrating methods 200, 225, and 250 of network slice monitoring and verification according to various embodiments. In particular, methods 200, 225, and 250 of FIGS. 2A-C may be implemented by various components in the network 100 of FIG. 1.

Turning specifically now to FIG. 2A, shown is method 200 performed by the slice application 150 and the storage application 178. Method 200 may be performed to instantiate a network slice in the network 100 of FIG. 1 and create a slice data structure 160 for the instantiated network slice.

At step 203, the slice application 150 may detect that a request for network slice instantiation has been received. For example, a client 109 may transmit a request for a network slice having certain subscription parameters via the slice configuration application 133. In this way, the network slice is requested to be instantiated based on subscription parameters (e.g., QoS parameters) included in the request.

For example, the subscription parameters may correspond to certain QoS parameters (e.g., a guaranteed latency), and the subscriber or subscriber account may be invoiced accordingly for the requested level of service. This request may be intercepted or detected by the slice application 150, based on communications to and from a slice configuration application 133. The slice application 150 may then detect that the slice configuration application 133 is instantiating a network slice in response to the request, to provide the requested QoS parameters for communications belonging to the client 109. For example, the slice configuration application 133 may reserve certain NEs (e.g., reserve a portion of resources provided by the NEs) in the carrier network 103 and network 117 along a path such that traffic for the UE 115 may be forwarded along this path with the guaranteed latency. The slice application 150 may detect the generation of this network slice. At step 206, the slice application 150 may record data regarding the generation of this network slice. For example, the slice application 150 may record the parameters 166 (e.g., the actual network attributes, QoS attributes, identifiers of NEs on the network slice, etc.) of the network slice that is being generated.

At step 209, the slice application 150 may transmit the recorded data to the storage application 178, for generation of the slice data structure 160. For example, the slice application 150 may transmit the recorded data to the storage application 178 via one or more API calls using APIs 153 and 175.

At step 212, the storage application 178 may generate the slice data structure 160 specifically identifying and describing the instantiated network slice. The slice data structure 160 may include the parameters 166 received from the slice application 150 in the recorded data. The slice application 150 may generate an identifier 163 based on the parameters 166 included in the slice data structure 160. At this stage, the storage application 178 has created the slice data structure 160 for the network slice including parameters 166 recorded upon instantiation of the network slice, which may ideally match the subscription parameters of the requested network slice by one or more clients 109.

At step 215, the slice application 150 may monitor usage of the network slice and detecting updates to the parameters 166 of the network slice. The monitored usage and detected updates may then be sent, at step 218, to the storage application 178, as usage data 169 and update data 172. For example, the usage data 169 may include one or more usage events, detailing the client 109 using the network slice, a duration of using the network slice, consumption of data and resources in the network slice, network attributes at the time of using the network slice, identification of an application or service in the network slice being used, etc. The usage data 169 may include multiple user events, even by different clients 109. At step 221, the storage application 178 may add the usage data 169 to the slice data structure 160.

The update data 172 may include updates to any of the parameters 166 that are already recorded in the slice data structure 160. At step 221, the storage application 178 may also add the update data 172 to the slice data structure 160. In some cases, the update data 172 may include an update to a parameter 166 already stored in the slice data structure 160 (e.g., a replacement of one NE on the network slice with another). In this case, the storage application 178 does not replace the identifier of the NE in the slice data structure 160 with the identifier of the other NE that replaces the NE on the network slice. Instead, the storage application 178 may simply add an entry to the slice data structure 160 including the identifier of the other NE that replaces the NE, and an indication that this NE is going to replace a previous NE on the network slice. The entry may also include an identifier of the to-be-replaced NE. In this way, data and entries may be added to the slice data structure 160, but prior entries of the slice data structure 160 may not be deleted, replaced, or otherwise modified.

Turning specifically now to FIG. 2B, shown is method 225 performed by the storage application 178 and a client application 121, 127 at a client 109. Method 225 may be performed to efficiently verify that the provisioned network slice meets the criteria requested by the client 109.

At step 228, the client application 121, 127 may request at least a portion of the slice data structure 160 from the storage application 178, for example, via one or more API calls using APIs 124, 129, and 153. For example, the requested portion of the slice data structure 160 may include at least a subset of the parameters 166 and update data 172 related to the parameters 166. The requested portion of the slice data structure 160 may be used to determine whether the actual network attributes and provided services of the network slice match the requested subscription parameters. For example, the request may include the identifier 163 of the network slice, which may have been sent to the client 109 upon generation of the slice data structure 160 by the storage application 178. In some cases, the storage application 178 may not be able to communicate directly with the client applications 121, 127 to inform the client applications 121, 127 about the identifier 163. Instead, the storage application 178 may return the identifier 163 to the slice application 150, which may then provide the identifier 163 to the client application 121, 127, for example, upon request form the client application 121, 127.

At step 231, the storage application 178 may obtain the requested portion of the slice data structure 160. For example, the storage application 178 may use the identifier 163 carried in the request to obtain the slice data structure 160, and then specifically obtain the subset of parameters 166 and update data 172 related to the parameters 166 requested by the client application 121, 127. At step 235, the storage application 178 may transmit the requested portion of the slice data structure 160 back to the client application 121, 127.

The client 109 may maintain or otherwise have access to the subscription parameters that may have been subscribed-for and may be expected for all communications and services related to the client 109. In this way, the client applications 121, 127 have access to and knowledge of the expected subscription parameters and network attributes for all communications, traffic, and services for the client 109. The client applications 121, 127 may compare the received data from the slice data structure 160 with the subscription parameters of the network slice for an efficient (immediate or instant) verification of the network slice allocated to the client.

When the data in the slice data structure 160 substantially or completely matches the subscription parameters, the network slice may be considered accurately provisioned in the network for the client 109. When the data in the slice data structure 160 does not substantially match the subscription parameters, the network slice may not be considered as accurately provisioned in the network for the client 109, and the situation may be easily escalated to an operations control center for resolution. In this way, the verification of the network slice provisioning for a client 109 may be performed autonomously by the client 109, in a relatively low-cost manner in which only the slice data structure 160 may be requested and sent back to the client 109 through the network 117, with minor computations involved for verification.

In some cases, the nature of the slice data structure 160, being immutable and securely stored in the data store 106, enables the client 109 to instruct the slice configuration application 133 to tear down and re-instantiate the network slice autonomously (e.g., without involvement of a central entity or the telecommunications carrier company). This may be because the client 109 has access to the parameters 166 of the network slice. The client 109 may be permitted to tear down and re-instantiate the network slice only within range of the parameters 166, as authorized, if the client 109 is still subscribed to the benefits of the network slice. Therefore, the nature of the slice data structure 160, again also being implemented using IPFS, may generally increase network capacity and reduce the consumption of resources that may have otherwise been necessary to tear down and re-instantiate the network slice (e.g., because a central entity may have had to previously be involved in the process of tearing down and re-instantiating the network slice).

Turning specifically now to FIG. 2C, shown is method 250 performed by the storage application 178 and a billing system application 144 at the core network 130. Method 250 may be performed to accurately invoice the client 109 for usage of the network slice.

At step 253, the billing system application 144 may request at least a portion of the slice data structure 160 from the storage application 178, for example, via one or more API calls using APIs 153 and 175. For example, the requested portion of the slice data structure 160 may include an identifier 163 of the network slice, the usage data 169, and in some cases, a subset of the parameters 166 and update data 172 related to the parameters 166. The requested portion of the slice data structure 160 may be used to accurately invoice the client for use of the network slice. For example, the usage data 169 may include usage events related to the usage of the network slice by a client 109 that is to-be-invoiced by the billing system application 144. The usage event may identify the client 109 that used the NEs and/or resources associated with providing the network slice, a time of initiating usage of the network slice, a duration of using the network slice, bandwidth used by the network slice, services used by the network slice, etc. In this way, the request for the usage data 169 may be used to obtain an accurate reflection of the usage and consumption of the network slice by a to-be-invoiced client 109 and the parameters 166 during usage of the network slice (i.e., whether the client 109 should be charged for receiving the QoS they subscribed for or whether the client 109 should not be charged since the QoS they subscribed for was not actually provided to the client traffic, as indicated in the parameters 166). In another embodiment, the storage application 178 may transmit the portion of the slice data structure 160 to the billing system application 144 based on, for example, a predefined threshold or an event. The portion of the slice data structure 160 may be transmitted alongside other relevant data to the billing system application 144 for the purpose of charging and invoicing.

At step 256, the storage application 178 may obtain the requested portion of the slice data structure 160. For example, the storage application 178 may use the identifier 163 carried in the request to obtain the slice data structure 160, and then use the slice data structure 160 to obtain the usage data 169, and, in some cases, to obtain the subset of the parameters 166 and update data 172 related to the parameters 166 requested by the billing system application 144. At step 259, the storage application 178 may transmit the requested portion of the slice data structure 160 back to the billing system application 144.

At step 262, the billing system application 144 may generate an invoice for the client 109 based on the usage of the network slice indicated in the slice data structure 160. For example, the invoice may indicate that the client 109 consumed a certain amount of resources and consumed a certain amount of data, and thus results in the invoice indicating a cost of the consumed resources and data. The client 109 may submit different methods of payment to pay the invoice. Standard methods of payment by the subscriber, customer, or vendor may be stored at the core network 130 and applied to the invoice. In some cases, non-fungible tokens (NFTs) may also be used to pay the invoice, when the NFT is submitted by the subscriber, customer, or vendor of the client 109.

NFTs may be used for other scenarios in the embodiments disclosed herein. For example, NFTs may be used for authentication purposes, to authenticate the client 109 in response to one of the requests described above with reference to FIGS. 2A-C. For example, certain clients 109 may transmit NFTs to the billing system application 144 for example, the slice configuration application 133, for the purpose of authenticating the client 109 to use the network slice. Similarly, clients 109 may transmit NFTs to the storage application 178 with the identifier 163 of the network slice for which the slice data structure 160 is requested. The storage application 178 may use the NFT to authenticate the client 109 based on whether the client 109 is permitted to receive the slice data structure 160. The client 109 may be permitted to receive the requested portion of the slice data structure 160 if the client 109, for example, received the identifier 163 from the storage application 178 and/or when the storage application 178 determines that the client 109 is authorized to use the network slice based on a subscription plan. In this way, NFTs may be used for payment and authentication purposes in the embodiments disclosed herein.

Figure 3:
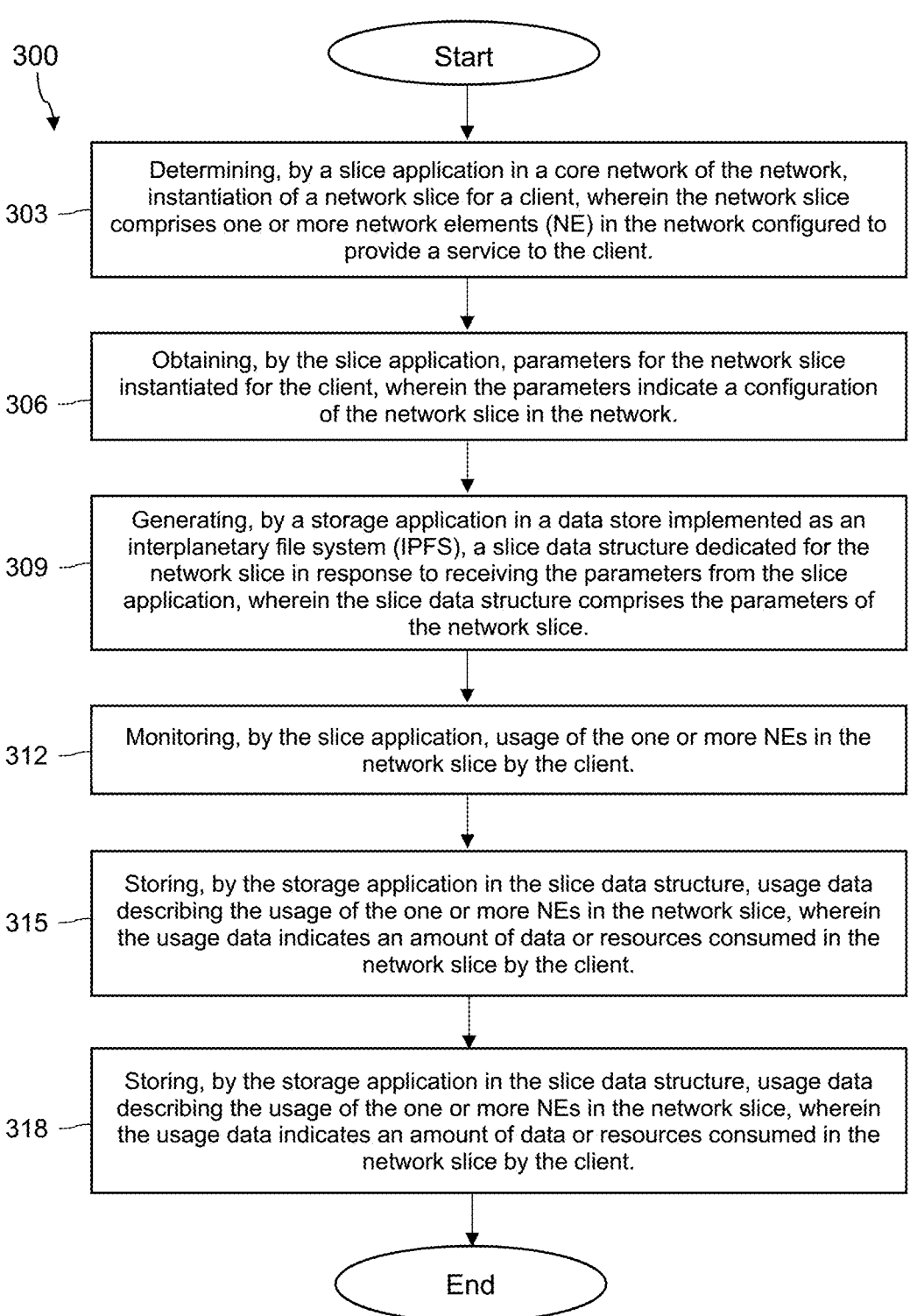
FIG. 3 is a flowchart of a first method of network slice monitoring and verification according to an embodiment of the disclosure.

Turning now to FIG. 3, shown is a flowchart illustrating method 300. Method 300 may be performed by the components of the network 100 of FIG. 1. In particular, method 300 may be performed by the slice application 150 in the core network 130 and the storage application 178 in the data store 106. Method 300 may be performed to instantiate a network slice in the network 100 and to record details regarding the network slice in the data store 106.

At step 303, method 300 comprises determining, by a slice application 150 in a core network 130 of the network, instantiation of a network slice for a client 109. In an embodiment, the network slice comprises one or more NEs in the network configured to provide a service to the client 109.

At step 306, method 300 comprises obtaining, by the slice application 150, parameters 166 for the network slice instantiated for the client 109. In an embodiment, the parameters 166 indicate a configuration of the network slice in the network.

At step 309, method 300 comprises generating, by a storage application 178 in a data store 106 implemented as an interplanetary file system (IPFS), a slice data structure 160 dedicated for the network slice. In an embodiment, the slice data structure 160 comprises the parameters 166 for the network slice in response to receiving the parameters 166 from the slice application 150.

At step 312, method 300 comprises monitoring, by the slice application 150, usage of the one or more NEs in the network slice by the client 109. At step 315, method 300 comprises updating, by the storage application 178 in the slice data structure 160, storing, by the storage application in the slice data structure, usage data 169 describing the usage of the one or more NEs in the network slice. In an embodiment, the usage data 169 indicates an amount of data or resources consumed in the network slice by the client 109. At step 318, method 300 comprises updating, by the storage application 178, the slice data structure 160 to indicate update data 172 describing an update to one or more parameters 166 of the network slice in response to receiving update data 172 from the slice application 150.

In some embodiments, method 300 may comprise additional steps and features not shown in the flowchart of FIG. 3. In an embodiment, method 300 further comprises communicating, by the slice application 150, with at least one of a SMF 139, an AMF 136, or an NSSF 141 in the core network 130 to monitor the usage of the network slice and detect the update to the network slice. In an embodiment, method 300 may further comprise generating, by the storage application 178, the identifier 163 of the network slice based on a hash function applied to the slice data structure 160, and storing, by the storage application 178, the identifier 163 of the network slice in the slice data structure 160. In an embodiment, method 300 further comprises transmitting, by the storage application 178, the identifier 163 of the network slice to the client 109 and one or more other applications that share the network slice with the client 109. In an embodiment, the slice data structure is implemented as a blockchain, or the slice data structure is implemented as a container. In an embodiment, the data stored in the slice data structure is immutable after being added to the slice data structure.

Turning now to FIG. 4, shown is a flowchart illustrating method 400. Method 400 may be performed by the components of the network 100 of FIG. 1. In particular, method 400 may be performed by the slice application 150 in the core network 130, the storage application 178 in the data store 106, and a client application 121, 127. Method 400 may be performed to instantiate a network slice in the network 100 and to record details regarding the network slice in the data store 106.

At step 403, method 400 comprises maintaining, by a storage application 178 in a data store 106 implemented as an interplanetary file system (IPFS) in the network, a slice data structure 160 dedicated for a network slice. In an embodiment, the slice data structure 160 comprises an identifier 163 of the network slice, parameters 166 describing the network slice, usage data 169 describing usage of the NEs in the network slice by one or more clients 109, and update data 172 describing updates to the parameters 166 of the network slice.

At step 406, method 400 comprises monitoring, by a slice application 150 in a core network 130 of the network, an instantiation of the network slice, the usage of the network slice by the one or more clients 109, and the updates to the parameters 166 of the network slice. At step 409, method 400 comprises transmitting, by the slice application 150 to the data store 106, data describing the instantiation of the network slice, the usage of the network slice by the one or more clients 109, and the updates to the parameters of the network slice.

At step 412, method 400 comprises updating, by the storage application 178, the slice data structure based on the data received from the slice application 150 to maintain an up-to-date representation of the network slice. At step 415, method 400 comprises transmitting, by the storage application, at least a portion of the slice data structure 160 to a client application in response to a request for the slice data structure received from the client application 121, 127 for verification that the network slice provided for the client 109 matches subscription parameters of the network slice. In an embodiment, the request comprises the identifier 163 of the network slice.

In some embodiments, method 400 may comprise additional steps and features not shown in the flowchart of FIG. 4. In an embodiment, method 400 further comprises communicating, by the slice application 150, with at least one of a SMF 139, an AMF 136, or an NSSF 141 in the core network 130 to monitor the instantiation of the network slice, the usage of the network slice by the one or more clients, and the updates to the parameters of the network slice. In an embodiment, method 400 may further comprise generating, by the storage application 178, the identifier 163 of the network slice based on a hash function applied to the slice data structure 160, and adding, by the storage application 178, the identifier 163 of the network slice to the slice data structure 160. In an embodiment, method 400 further comprises generating, by the slice application 150, usage data 169 describing the usage of the network slice by the one or more clients 109, in which the usage data 169 indicates an amount of data or resources consumed in the network slice by the client. In an embodiment, the updates to the configuration of the network slice comprise updates to the parameters 166 describing the network slice. In an embodiment, the slice data structure 160 is implemented as at least one of a blockchain or a container, and wherein the slice data structure is immutable.

Figure 5A:
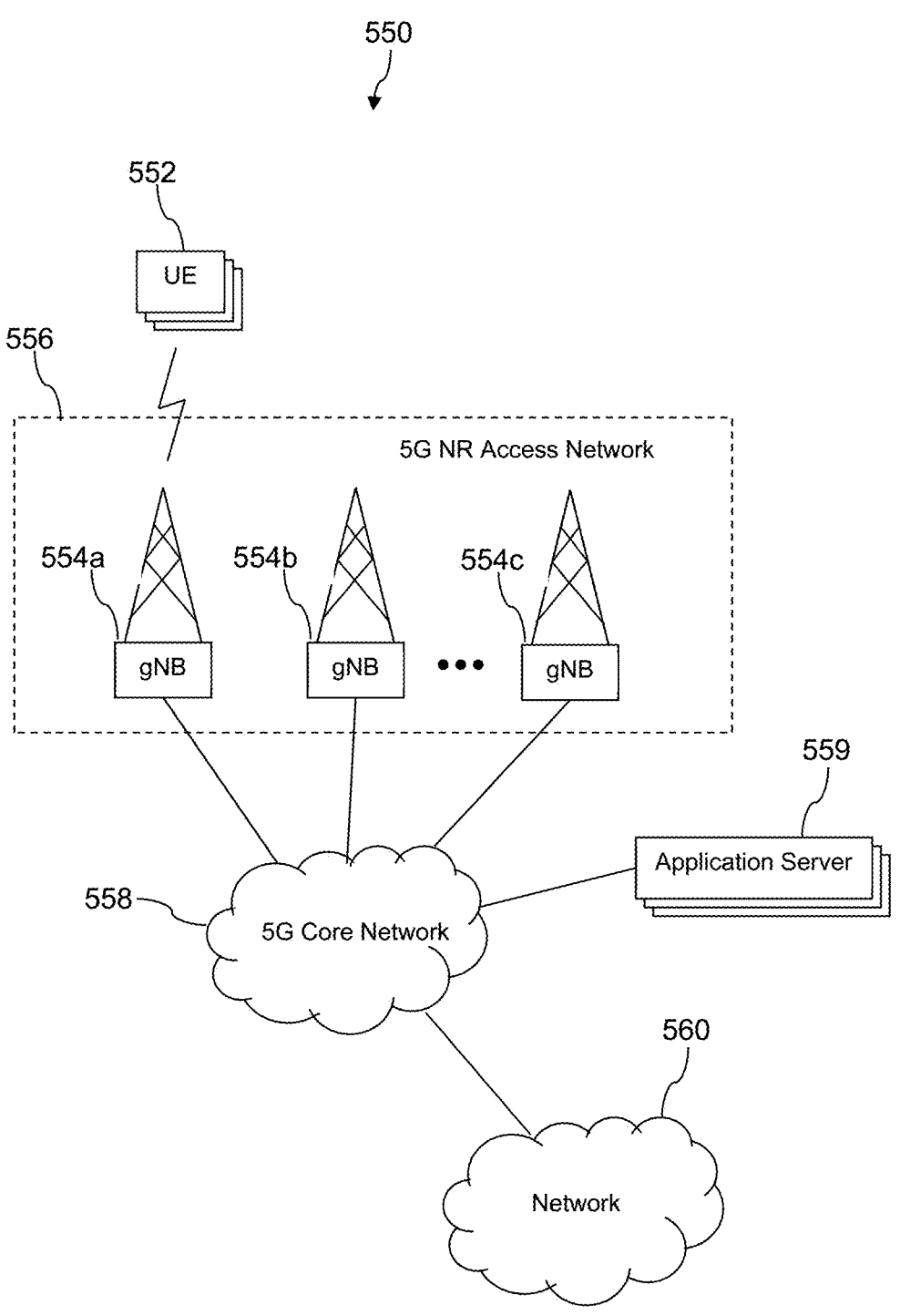
FIGS. 5A-B are block diagrams illustrating a communication system similar to the communication system of FIG. 1 according to an embodiment of the disclosure.
Figure 5B:
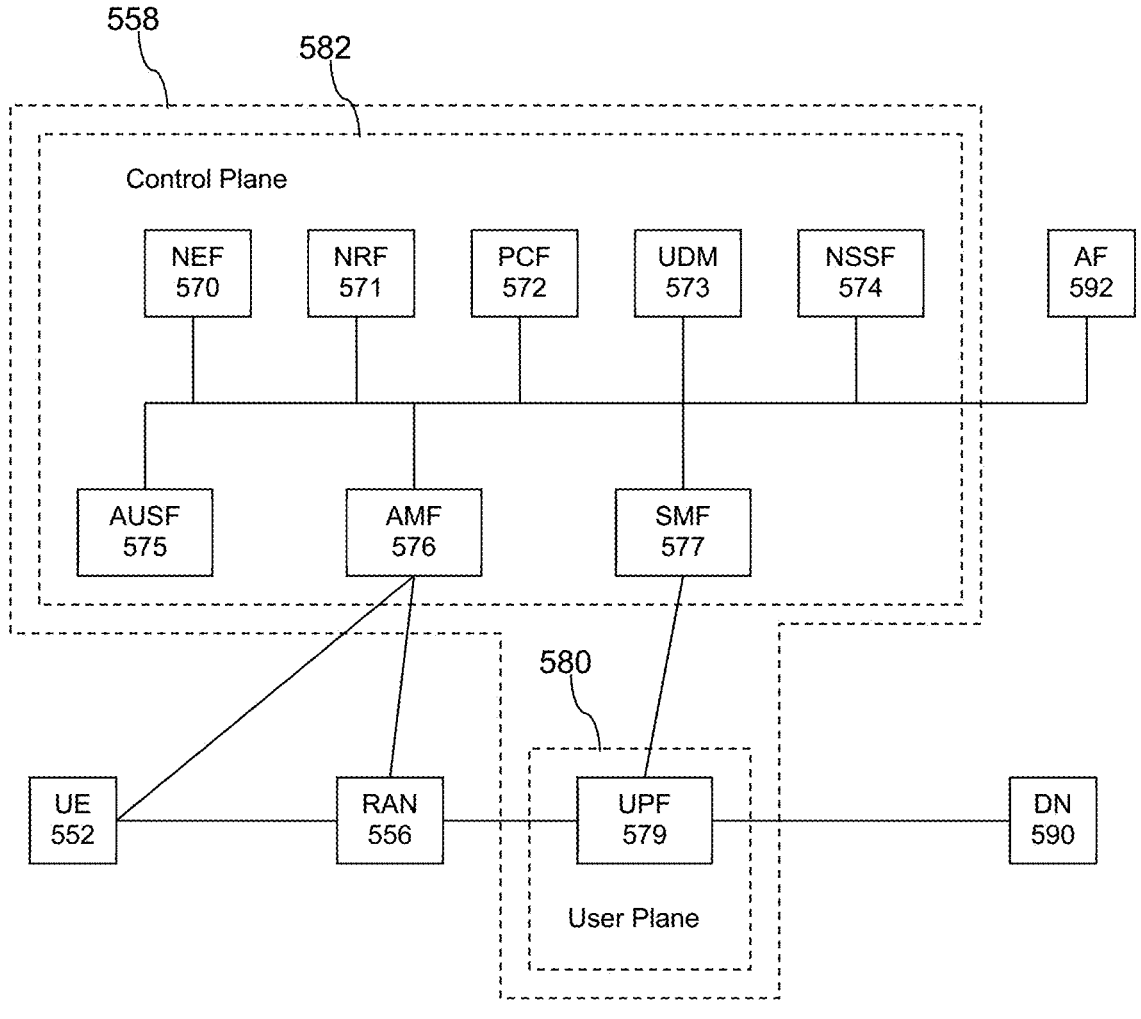

Turning now to FIG. 5A, an exemplary communication system 550 is described. In an embodiment, the communication system 550 may be implemented in the network 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated). Turning now to FIG. 5B an application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
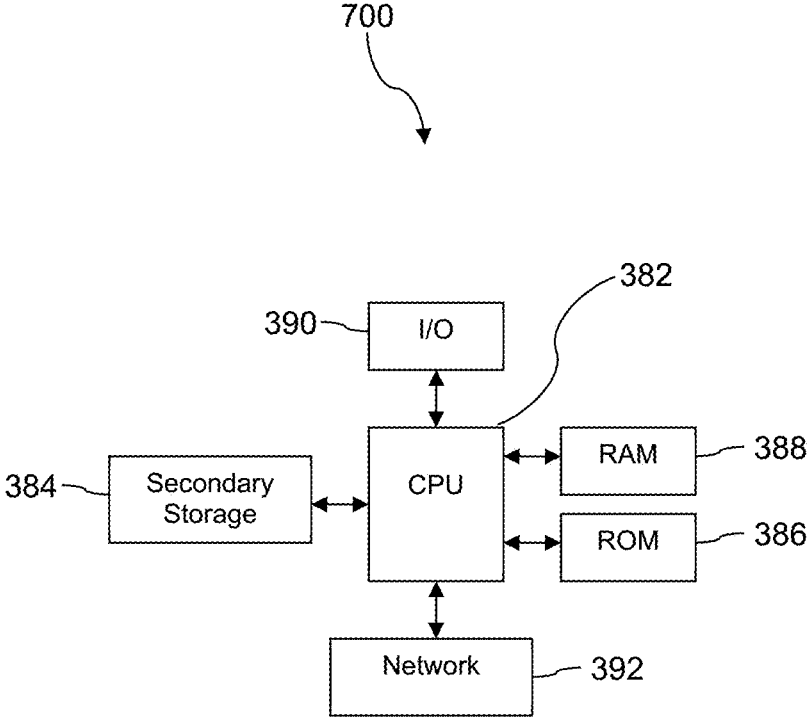
FIG. 6 is a block diagram of a computer system implemented within the communication system of FIG. 1 according to an embodiment of the disclosure.

FIG. 6 illustrates a computer system 700 suitable for implementing one or more embodiments disclosed herein. In an embodiment, the slice application 150, the storage application 178, the third-party enterprise system 112, and/or the UE 115 may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
at least one processor;
at least one data store implemented as an interplanetary file system (IPFS);
a storage application, stored in the at least one data store, which when executed by the at least one processor, causes the at least one processor to be configured to maintain a slice data structure dedicated for a network slice, wherein the slice data structure comprises an identifier of the network slice, parameters describing a configuration of the network slice, usage data describing a usage of the network slice by a client, and updates to the parameters of the network slice; and
a slice application, stored at least one non-transitory memory, which when executed by the at least one processor, causes the at least one processor to be configured to:
monitor an instantiation of the network slice, the usage of the network slice by the client, and the updates to the parameters of the network slice; and
transmit, to the at least one data store, data describing the instantiation of the network slice, the usage of the network slice by the client, and the updates to the configuration of the network slice;
wherein the storage application is further configured to:
update the slice data structure based on the data received from the slice application to maintain an up-to-date reflection of the network slice; and
transmit at least a portion of the slice data structure to a billing system application in response to a request for the slice data structure received from the billing system application to generate an invoice for the client, and wherein the request comprises the identifier of the network slice.

2. The system of claim 1, wherein the slice application is further configured to communicate with at least one of a session management function (SMF), an access and mobility management function (AMF), or a network slice selection function (NSSF) in the system monitor the instantiation of the network slice, the usage of the network slice by the client, and the updates to the parameters of the network slice.

3. The system of claim 1, wherein the storage application is further configured to generate the identifier of the network slice based on a hash function applied to the slice data structure.

4. The system of claim 3, wherein the storage application is further configured to add the identifier of the network slice in the slice data structure.

5. The system of claim 1, wherein the slice application is further configured to generate usage data describing the usage of the network slice by the client, wherein the usage data indicates an amount of data or resources consumed in the network slice by the client.

6. The system of claim 1, wherein the updates to the configuration of the network slice comprise updates to the parameters describing the network slice.

7. A method for network slice monitoring and verification in a network, wherein the method comprises:
maintaining, by a storage application in a data store implemented as an interplanetary file system (IPFS) in the network, a slice data structure dedicated for a network slice, wherein the slice data structure comprises an identifier of the network slice, parameters describing a configuration of the network slice, usage data describing a usage of one or more network elements (NEs) in the network slice by one or more clients, and update data describing updates to the parameters of the network slice;
monitoring, by a slice application in a core network of the network, an instantiation of the network slice, the usage of the network slice by the one or more clients, and the updates to the parameters of the network slice;
transmitting, by the slice application to the data store, data describing the instantiation of the network slice, the usage of the network slice by the one or more clients, and the updates to the parameters of the network slice;
updating, by the storage application, the slice data structure based on the data received from the slice application to maintain an up-to-date representation of the network slice; and
transmitting, by the storage application, at least a portion of the slice data structure to a client application in response to a request for the slice data structure received from the client application for verification that the network slice provided for the client matches subscription parameters of the network slice, wherein the request comprises the identifier of the network slice, wherein the client application autonomously verifies the subscription parameters of the network slice using the portion of the slice data structure.

8. The method of claim 7, further comprising communicating, by the slice application, with at least one of a session management function (SMF), an access and mobility management function (AMF), or a network slice selection function (NSSF) in the core network to monitor the instantiation of the network slice, the usage of the network slice by the one or more clients, and the updates to the parameters of the network slice.

9. The method of claim 7, further comprising generating, by the storage application, the identifier of the network slice based on a hash function applied to the slice data structure.

10. The method of claim 9, further comprising adding, by the storage application, the identifier of the network slice to the slice data structure.

11. The method of claim 7, further comprising generating, by the slice application, usage data describing the usage of the network slice by the one or more clients, wherein the usage data indicates an amount of data or resources consumed in the network slice by the one or more clients.

12. The method of claim 7, wherein the updates to the configuration of the network slice comprise updates to the parameters describing the network slice.

13. The method of claim 7, wherein the slice data structure is implemented as at least one of a blockchain or a container, and wherein the slice data structure is immutable.

14. A method for network slice monitoring and verification in a network, wherein the method comprises:

determining, by a slice application in a core network of the network, instantiation of a network slice for a client, wherein the network slice comprises one or more network elements (NE) in the network configured to provide a service to the client;

obtaining, by the slice application, parameters for the network slice instantiated for the client, wherein the parameters indicate a configuration of the network slice in the network;

generating, by a storage application in a data store implemented as an interplanetary file system (IPFS), a slice data structure dedicated for the network slice in response to receiving the parameters from the slice application, wherein the slice data structure comprises the parameters of the network slice;

monitoring, by the slice application, usage of the one or more NEs in the network slice by the client;

storing, by the storage application in the slice data structure, usage data describing the usage of the one or more NEs in the network slice, wherein the usage data indicates an amount of data or resources consumed in the network slice by the client; and updating, by the storage application, the slice data structure to indicate update data describing an update to one or more parameters of the network slice in response to receiving update data from the slice application.

15. The method of claim 14, further comprising communicating, by the slice application, with at least one of a session management function (SMF), an access and mobility management function (AMF), or an network slice selection function (NSSF) in the core network to monitor the usage of the network slice and detect the update to the network slice.

16. The method of claim 14, further comprising generating, by the storage application, an identifier of the network slice based on a hash function applied to the slice data structure; and storing, by the storage application, the identifier of the network slice in the slice data structure.

17. The method of claim 16, further comprising transmitting, by the storage application, the identifier of the network slice to the client and one or more other applications that share the network slice with the client.

18. The method of claim 14, wherein the slice data structure is implemented as a blockchain.

19. The method of claim 14, wherein the slice data structure is implemented as a container.

20. The method of claim 14, wherein data stored in the slice data structure is immutable after being added to the slice data structure.

\* \* \* \* \*